United States Patent

Harris et al.

[11] Patent Number: 5,867,274
[45] Date of Patent: Feb. 2, 1999

[54] SYSTEM FOR THE MEASUREMENT OF THE CUT LENGTH OF MOVING ARTICLES

[75] Inventors: David E. Harris, Powell; Edwin B. Wagstaff, Jr., Delaware, both of Ohio; Kevin C. Abnett, Fairbanks, Ak.

[73] Assignee: Harris Instrument Corporation, Delaware, Ohio

[21] Appl. No.: 800,837

[22] Filed: Feb. 14, 1997

[51] Int. Cl.⁶ .................................................. G01B 11/04
[52] U.S. Cl. ..................................... 356/383; 250/559.26
[58] Field of Search ..................................... 356/372, 383; 250/559.12, 559.13, 559.15, 559.26

[56] References Cited

U.S. PATENT DOCUMENTS

| | | | |
|---|---|---|---|
| 3,448,278 | 6/1969 | O'Brien et al. ........................ 250/219 |
| 3,567,320 | 3/1971 | Chitayat ..................................... 356/4 |
| 3,574,411 | 4/1971 | Miller ........................................ 302/49 |
| 3,653,770 | 4/1972 | Yamamuro . | |
| 3,688,804 | 9/1972 | Brown et al. ............................... 139/1 |
| 3,724,958 | 4/1973 | Callan . | |
| 3,739,177 | 6/1973 | Ko ........................................... 250/206 |
| 3,781,115 | 12/1973 | Rader et al. . | |
| 3,856,411 | 12/1974 | Zanoni . | |
| 3,856,412 | 12/1974 | Zanoni . | |
| 3,988,669 | 10/1976 | Fasching ..................................... 324/65 |
| 4,088,411 | 5/1978 | Ahlquist et al. . | |
| 4,123,169 | 10/1978 | Meriläinen et al. . | |
| 4,300,836 | 11/1981 | Holmes et al. ......................... 356/376 |
| 4,329,876 | 5/1982 | Chen et al. ................................ 73/618 |
| 4,360,274 | 11/1982 | Norton-Wayne ....................... 356/394 |
| 4,427,295 | 1/1984 | Nishiyama .............................. 356/371 |
| 4,456,982 | 6/1984 | Tournois .................................. 367/11 |
| 4,461,576 | 7/1984 | King ........................................ 356/375 |
| 4,465,937 | 8/1984 | Forbes ..................................... 250/560 |
| 4,499,383 | 2/1985 | Loose ...................................... 250/561 |
| 4,521,112 | 6/1985 | Kuwabara et al. ..................... 356/375 |
| 4,521,113 | 6/1985 | Kuwabara et al. ..................... 356/387 |
| 4,555,633 | 11/1985 | Björkelund ............................. 250/560 |
| 4,559,451 | 12/1985 | Curl ........................................ 250/560 |
| 4,559,452 | 12/1985 | Igaki et al. .............................. 250/560 |
| 4,648,718 | 3/1987 | Sadamitsu et al. ..................... 356/387 |
| 4,679,941 | 7/1987 | Fujita ...................................... 356/384 |
| 4,680,806 | 7/1987 | Bolza-Schünemann .................. 382/65 |
| 4,850,232 | 7/1989 | Markis .................................... 73/865.8 |
| 4,959,040 | 9/1990 | Gardner et al. ......................... 474/103 |
| 5,006,719 | 4/1991 | Blaser .................................... 250/560 |
| 5,220,177 | 6/1993 | Harris ..................................... 250/548 |
| 5,227,985 | 7/1993 | DeMenthon ............................ 364/559 |
| 5,260,762 | 11/1993 | Telle ........................................... 356/5 |
| 5,383,021 | 1/1995 | Hanna .................................... 356/383 |
| 5,394,095 | 2/1995 | Kespohl .................................. 324/674 |
| 5,469,262 | 11/1995 | Keen et al. ............................. 356/386 |
| 5,546,808 | 8/1996 | Harris ....................................... 73/618 |

FOREIGN PATENT DOCUMENTS

| | | | |
|---|---|---|---|
| 214920 | 10/1984 | German Dem. Rep. ............. 356/383 |
| 57-46103 | 3/1982 | Japan ..................................... 356/383 |

Primary Examiner—F. L. Evans
Attorney, Agent, or Firm—Standley & Gilcrest

[57] ABSTRACT

A system and process are described in which moving articles that are cut during a manufacturing process have their cut length measured with the use of an electronic light emitting scanner in combination with a light receiver. Accurate cut length measurements are obtained from mathematical processing of the light receiving information electronically gathered from the apparatus of the system.

3 Claims, 5 Drawing Sheets

SYSTEM FOR THE MEASUREMENT OF THE CUT LENGTH OF MOVING ARTICLES

BACKGROUND AND SUMMARY OF THE INVENTION

The present invention relates generally to measurement systems, and more particularly, to non-contact measuring of the cut length of moving articles through a manufacturing process. The invention includes an electromagnetic radiation emitter, an electromagnetic radiation receiver, and a measurement processing unit.

Materials undergoing industrial production processes vary widely in physical makeup, such as extruded plastics or steel billets. The speed of movement of these materials as they are being processed also varies widely. Some processes may move a work piece at a very slow rate of speed while other processes may move a work piece at speeds of upwards to 90 mph.

In many manufacturing processes there is an ongoing need to measure the cut length of articles made during a manufacturing process. A wide assortment of devices have been designed to provide precision and repeatability of high speed cut to length operations. In many of these operations, the movement of the uncut article is measured with a pulse counting encoder attached to a driven role or conveyor belt. When the required number of pulses have passed the knife or the saw device, the cutter is triggered and the product is cut to the desired length. In other systems, a through beam photo sensor is broken by the advancing product and the cutter is triggered to cut the product to the target length. Many operating variables may affect the precision of these cut to length systems. For example, the material may slip, stretch or compress on the conveyor belt or driven roller. The cutter may have delays that vary with the thickness or density of the material being cut. The actual mechanical setup may be incorrect in the case of through beam sensors. Also, the sensors may become contaminated and cause unacceptable errors in the finished cut lengths produced.

At present, the accuracy of most cut to length operations must depend on the manual measurement of the finished product by the machine operator or the quality assurance person. Errors can lead to excessive scrap, wasted machine time, or lost orders as the end product is rejected by a demanding customer. The system of the present invention may be used to make accurate, line speed independent, length measurements of moving parts. Depending upon the size of the present system chosen, a wide range of lengths may be measured without physically moving the present invention during the measurement process.

One measurement system which has found substantial acceptance in industry is marketed under the trademark "SCAN-A-LINE®". The SCAN-A-LINE® measurement system employs a linear array of electromagnetic radiation emitting diodes positioned on one side of a material, such as a web or sheet moving within a production process. The diodes of the array are illuminated in a scanning sequence having a stable time base, for example, at a 20 KHZ rate developed by a quartz crystal oscillator. Positioned above the moving material under production and opposite the associated diode array, is a tuned photoresponsive receiver which reacts to the illumination emanating from the diodes which are unblocked or partially blocked from view by the receiver by the moving material. Associated controls connected to the receiver are called upon to extrapolate the electromagnetic radiation signals to develop measurement information concerning the material. The extrapolation is based upon the observation that each LED in the emitting array produces a cone of electromagnetic radiation, and the electromagnetic radiation cones from adjacent LEDs overlap in the electromagnetic radiation path to the receiver. The SCAN-A-LINE® system is marketed by Harris Instrument Corporation of Delaware, Ohio.

The SCAN-A-LINE® system was first patented in U.S. Pat. No. 5,220,177, which issued on Jun. 15, 1993. The patent described a system wherein each electromagnetic radiation emitting device of the array utilized is energized by a unique drive current which is preselected to cause the emission of electromagnetic radiation exhibiting substantially uniform intensity at the receiver when there is no attenuation of the electromagnetic radiation by a material under edge evaluation.

With the apparatus of the present invention, one or more receivers may be employed with one or more emitters. In the present invention, preferably one receiver is used for each emitter.

The present invention incorporates an array of light emitting diodes to scan a moving part electronically. The light emitting diodes in the array are pulsed sequentially at a predetermined rate. By mathematically processing the time in which light receivers are blocked from receiving the light emitted by specific pulsating light emitting diodes, an accurate length measurement may be made of a moving part in a manufacturing process.

DETAILED DESCRIPTION OF PREFERRED EMBODIMENT(S)

Figure 1:
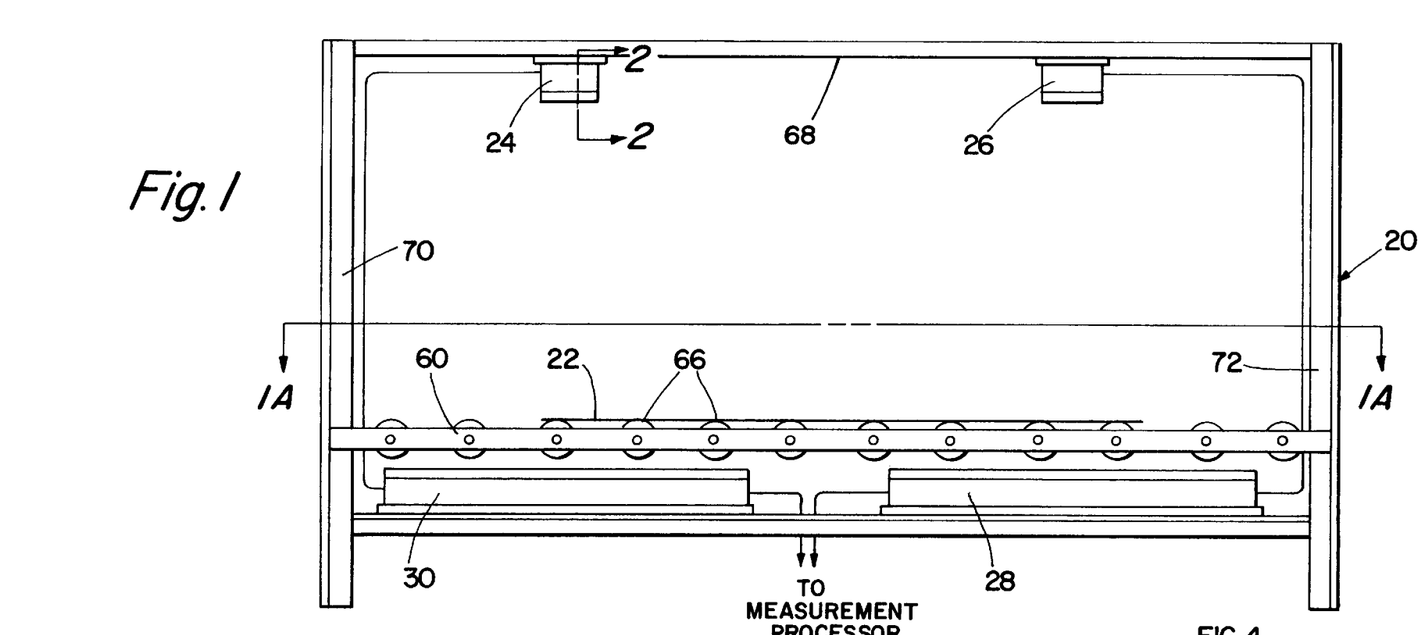
FIG. 1 is a view of one embodiment of an apparatus of the present invention employed to measure a sheet of material.
Figure 1A:
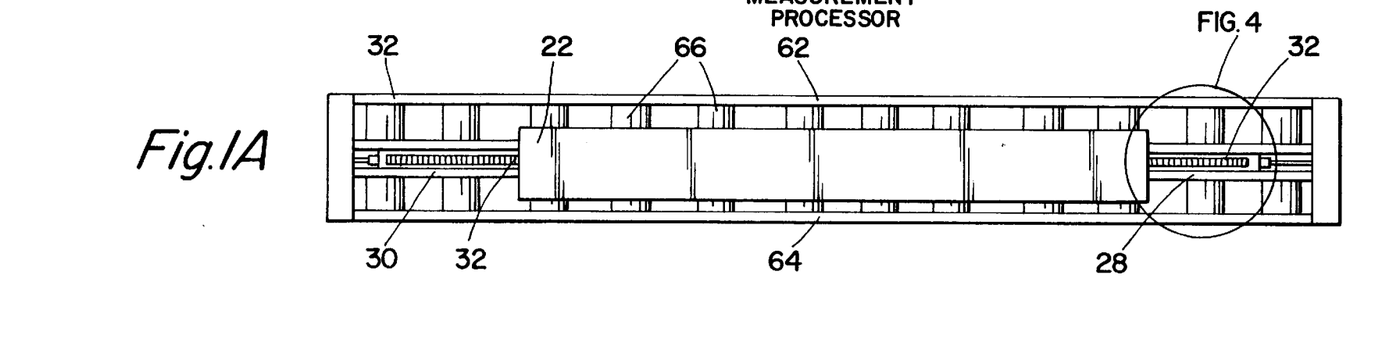
FIG. 1A is a sectional view taken along line 1—1 of FIG. 1.
Figure 1B:
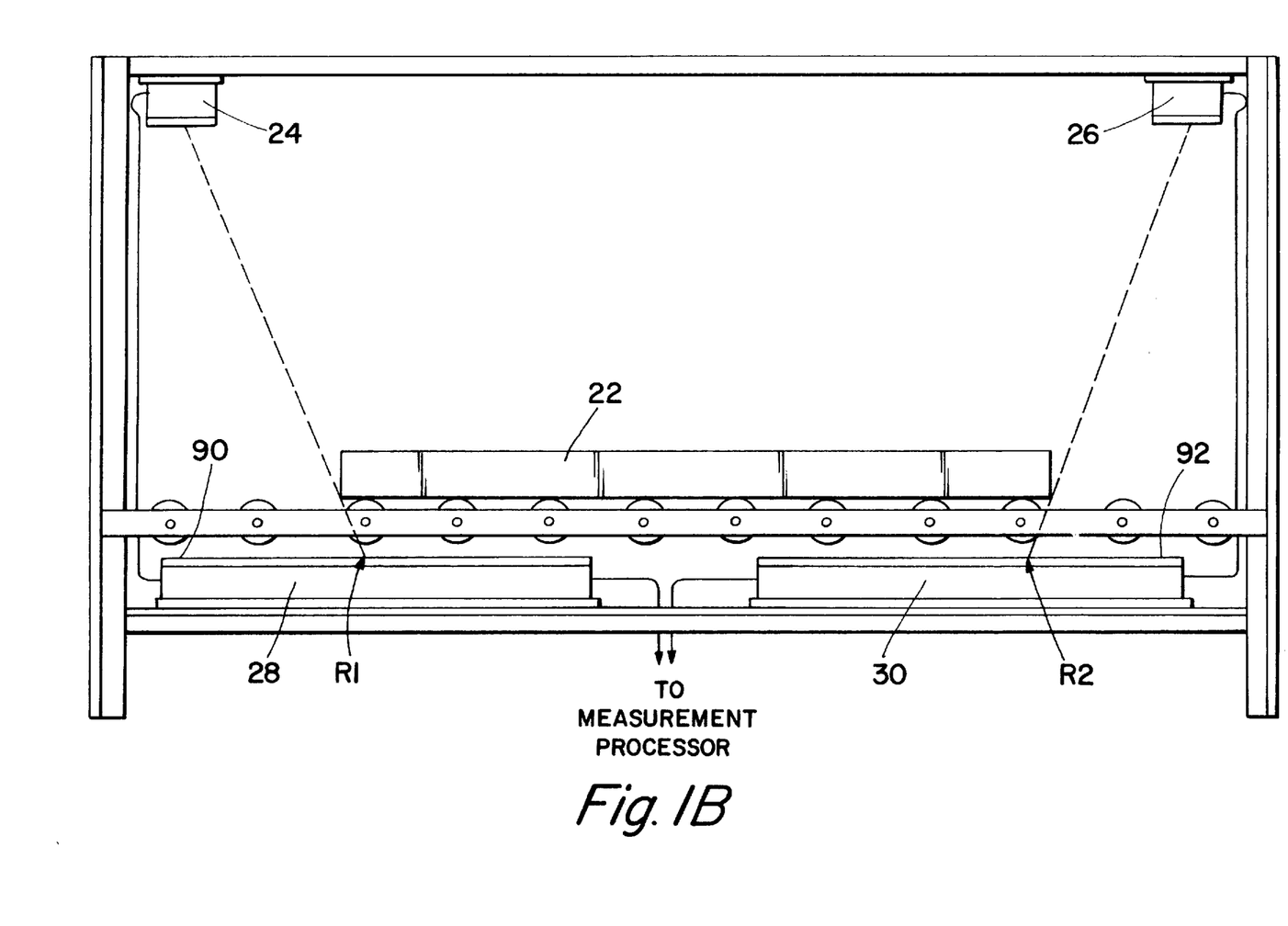
FIG. 1B is a diagrammatic view of a component arrangement variation of the embodiment shown in FIG. 1.

Referring now to the drawings, and particularly FIG. 1, the apparatus of the present invention is represented at 20. For example purposes only, and not to be construed as limiting, the apparatus 20 is shown installed in a steel processing facility wherein steel strip material is cut into specific lengths within a process wherein they are guided along a conveyor line. Each outside end of a cut strip 22 is monitored by receivers 24 and 26. The cut steel strip 22 is shown as it moves along a conveyor 60 having side supports 62 and 64 which support a plurality of conveyor rollers 66.

With the exception of a right-left reversal, the first receiver 24 is preferably identical to the second receiver 26.

The apparatus 20 also includes two emitters 28 and 30, which comprise housings within which are supported linear arrays of discrete electromagnetic radiation sources configured to emit electromagnetic radiation preferably in the visible region of the electromagnetic spectrum. The electromagnetic radiation emission may be transmitted through a planar lens mounted within slits or elongate openings 32. The emitters housings 28 and 30 are preferably mounted so as to position the slits 32 parallel to the direction of travel of the cut strip 22. In one embodiment of the present invention, the emitters 28 and 30 are located below the bottom surface of the conveyor 60.

The first and second receivers 24, 26 are preferably mounted along a brace 68 that may be supported by posts 70 and 72. The stand-off distance or distance between the receivers 24, 26 and the conveyor 60 is preferably many times greater than the distance from the conveyor to the emitter housings 28 and 30. A passline is defined in the present invention as the plane through which electromagnetic radiation from the slits 32 impinges upon the bottom surface of the workpiece 22 and is seen as it extends beyond the outside edge thereof by one or more of the receivers.

The array of electromagnetic radiation emitting devices incorporated within the emitters 28 and 30 will vary in length depending upon the application at hand. The accuracy of measurement achieved with the present invention is enhanced as the density or number of electromagnetic radiation emitting devices per unit length of emitters 28 and 30 is increased. The spacing between each electromagnetic radiation emitting device 36 of emitters 28 and 30 is preferably the same between each device 36. In one embodiment of the present invention a 0.1 inch center-to-center spacing between emitting devices 36 is provided. The electromagnetic radiation emitting devices 36 are preferably individually sequentially energized to emit electromagnetic radiation in a predetermined rate determined by the length of the emitter array. In one embodiment of the present invention, one-half cycle of a 20 kHz. clock or scanning frequency is incorporated. When the last device in such an array has been energized and then cutoff, a reset signal is generated to begin the sequence again at the first device 36 of the arrays in both emitters 28 and 30. The reset signal may be referred to as the "Sync Pulse". As the individual devices 36 of the arrays in emitters 28 and 30 are energized in a sequential scanning fashion and the electromagnetic radiation emitted progresses from a non-attenuated outside region or cut edge of the material being measured such as cut steel strip or workpiece 22, a variation of the peak intensity of the emitted radiation for this scan region will be sensed at the associated receivers 24, 26. This variation in attenuation results in the generation of a stair step form of waveform which is preferably processed by low pass filtering to achieve a smooth curve. The midpoint of this curve is preferably detected to evolve a time based trigger pulse which, when compared in time to the position of the sync pulse may be employed by read out or control systems to determine the location of an outside edge or the width of opposite edges of the workpiece 22.

Figure 2:
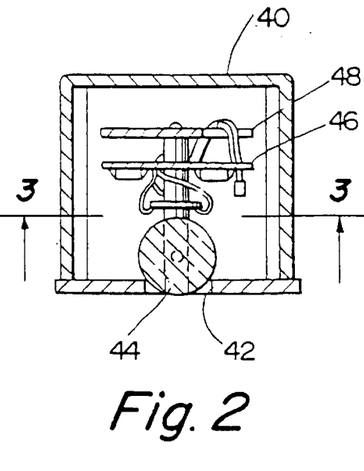
FIG. 2 is a sectional view taken along line 2—2 of FIG. 1.
Figure 3:
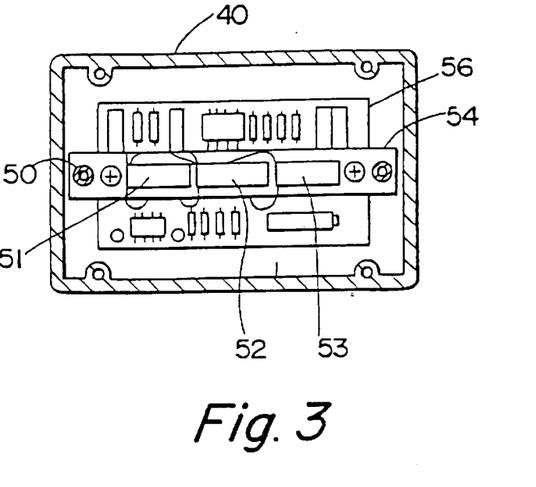
FIG. 3 is a sectional view taken along line 3—3 of FIG. 2.

Referring to FIG. 2 and 3, internal structure of the receiver preferably includes a housing 40 having an opening therein at 42. The opening 42 is preferably aligned in parallel with the corresponding slit 32 of the emitters 28 and 30 as seen in FIG. 1. A cylindrical gathering lens 44 is placed in association with the opening 42. Above the lens 44, a circuit board 46 and a shield 48 are secured within the housing 40. A support board 50 is seen in FIG. 3 and preferably supports three rectangular silicon solar cells 51, 52, 53 in a linear array. The solar cells are preferably coupled in parallel. Each of the solar cells, in this example, has a lengthwise extent of 2 centimeters and, thus, coupled in a grouping of three in the linear array as shown, the length of the photoresponsive components amounts to approximately 6 centimeters. A filter 54 may be positioned over the entrances to these devices which confronts all electromagnetic radiation impinging thereon and passes only visible electromagnetic radiation or infrared radiation within a selected region of the electromagnetic spectrum.

Figure 4:
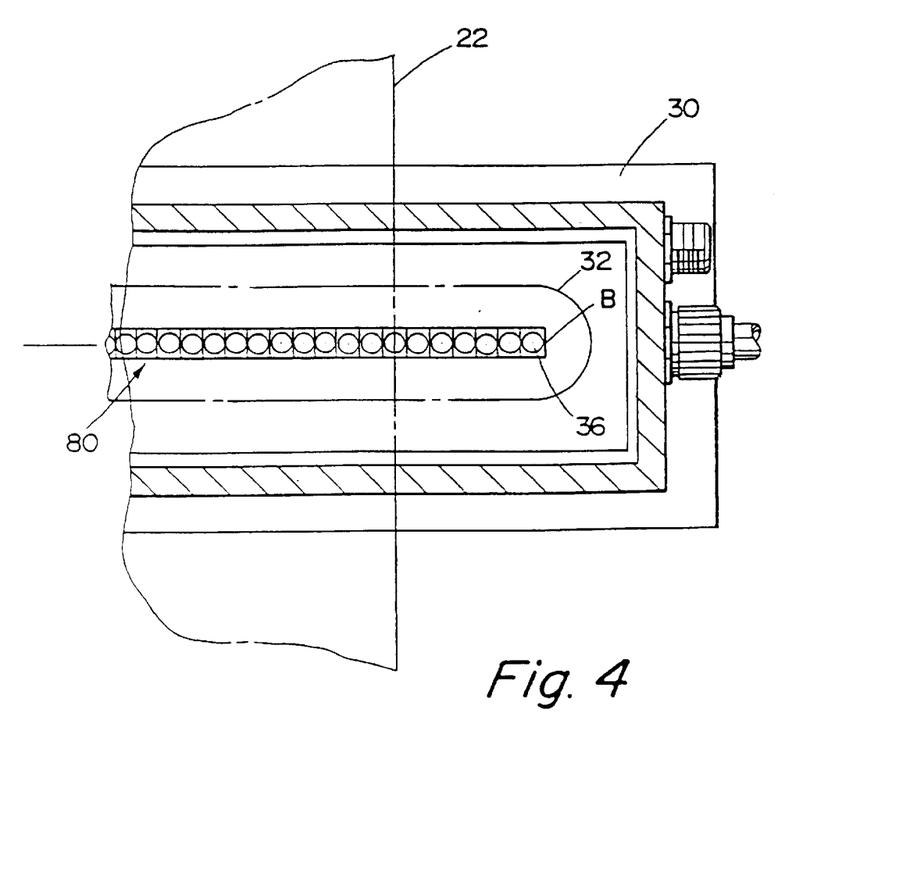
FIG. 4 is an enlarged partial view taken along line 4—4 of FIG. 1A.

Referring now to FIG. 4, the array of electromagnetic radiation emitting devices 36 are represented generally at 80 behind the slit 32. Within the array 80, the scanning sequence may progress with the first of the devices in the row. Complete emitters, receivers and associated hardware may be purchased from Harris Instrument Corporation in Delaware, Ohio.

Figure 5:
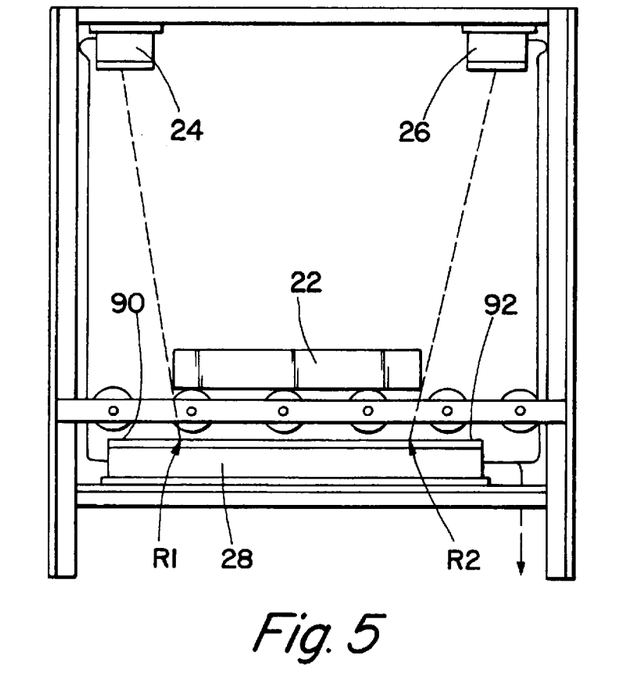
FIG. 5 is a diagrammatic view of an embodiment of the present invention having a single emitter in association with two spaced-apart receivers.

Referring now to FIG. 5, a preferred arrangement of the apparatus of the present invention is shown in which a thick workpiece 22 is shown in spaced relationship apart from emitters 28 and 30. Positioned directly above a last edge 90 of said emitter 28 is the first receiver 24. Positioned directly over a last edge 92 of the emitter 30 is a second receiver 26. Receivers 24 and 26 are positioned over the end diodes in the arrays to insure that their view paths to the arrays in emitters 28 and 30 are blocked only by the bottom edge of the thick workpiece. In this manner, the length of the workpiece 22, can be measured independent of the thickness of the workpiece.

Electromagnetic radiation visible to receiver 24 at location R1 along the array in emitter 28, is the first diode to be visible by receiver 24 in a right to left scan direction, because all of the previous diodes were blocked from the view of receiver 24 by the workpiece 22. Location R2 along the array in emitter 30 is the first diode to be seen by receiver 26 because all previous diodes in that array were blocked from view by the workpiece 22.

Figure 6:
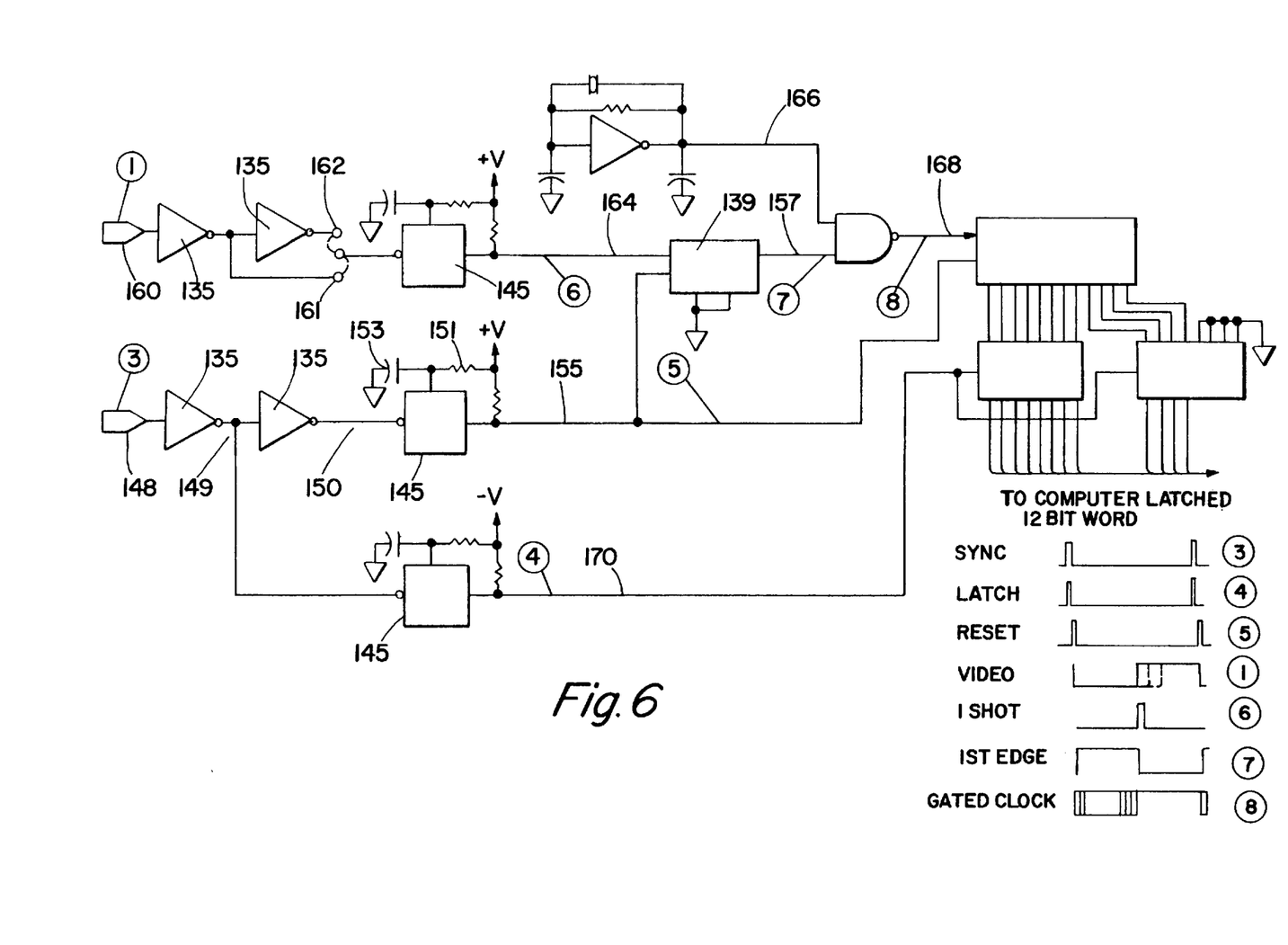
FIG. 6 is an electrical schematic diagram of an embodiment of a video pre-processor of the present invention.
Figure 7:
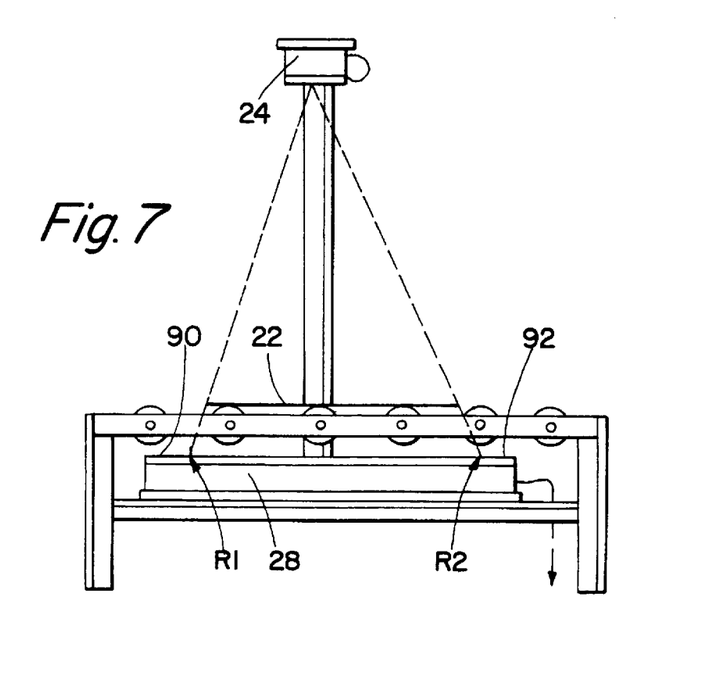
FIG. 7 is diagrammatic view of an embodiment of the present invention having a single emitter in association with a single receiver.

Referring now to FIG. 6, an electrical schematic of one embodiment of a processor of the present invention is shown. Identical circuits may be used to process the signals from both sensors in this system. For simplicity, only one circuit is described in FIG. 6. Ordinary 4000 Series CMOS logic circuits were chosen for this application, although any logic family could be used. The IC's labeled 135 are CMOS buffer/inverter sections from a 4049 integrated circuit. The 4013 CMOS integrated circuit 139 is a bi-stable multivibrator (flip-flop). The NE558, 145 is a negative triggered one-shot multivibrator. When a negative going transition is sensed at the input, the NE558 produces a pulse at the output. The length of the output pulse is determined by the resistor and capacitor at the timing input of the circuit.

The Sync Pulse that signals the end of one scan and the beginning of another is connected to a 4049 inverter at node 148. The inverted Sync Pulse at node 149 of the 4049 is connected to the input of another 4049 inverter. The output of the second 4049 at node 150 is connected to the NE558 where it triggers the one-shot multivibrator to produce a positive output pulse slightly longer than the Sync Pulse. The length of the pulse produced is determined by the resistor 151 and capacitor 153. This pulse from node 155 of the NE558 is connected to the SET input of the 4013 flip-flop. The SET input pulse causes the Q output at node 157 to go to logic 1 at the beginning of each scan.

In the present invention the scans from both sensors are processed in real time. To avoid sensor confusion, the video signal detected by the sensor is sorted to determine if the signal amplitude is rising or falling as an edge is approached in the scan. When the emitters are scanned from the outside ends toward the center of the workpiece, the edges to be measured will be "falling amplitude" edges. When the emitters arrays are scanned from the center of the workpiece toward the outside ends, the edges to be measured will be rising amplitude edges. The edge sensing circuitry is designed to trigger selectivity on either the first rising edge or the first falling edge. The edge polarity required is jumper selectable. In a two sensor length gauge with scans beginning in the center and scanning outward, the synchronized beginning of the scans sets the outputs to logic one and the first rising edges set them to zero. In this manner, the trailing edge of one workpiece can be measured even when the leading edge of another workpiece is also in the measurement range of the emitter. To determine the edge positions, these logic signals are used to gate a series of clock pulses into two counters. Each time the scan finishes, the counters are read by a microprocessor and then reset to zero count before beginning the next scan. One counter is used for each edge of the product to be measured.

A 12 bit resolution was chosen to process the length measurement. Higher resolution could be used to achieve greater accuracy. The video signal [1] from the sensor at node 160 is input to a pair of 4049 inverter/buffers so that either logic true or false logic stages are available. The jumper marked 162 and 161 allows the selection of polarity. The jumper is shown with the inverse polarity selected at 161. In this mode the circuit will function as follows: The trailing edge of the Sync Pulse triggers the Reset one shot [NE558] to produce a reset pulse [5] at node 155. This pulse clears the 4040 12 bit binary counter and sets the Q output of the 4013 R/S flip-flop to the logic one state[7]at node 157. Because the inverse video jumper was selected, when the first falling edge is encountered in the inverted video signal [2] at node 161, the video one shot NE558 produces a brief pulse that resets the 4013 flip-flop output at node 157 to the logic zero state. The Q output at node 157 from the 4013 [7] is input to the 4011 and gate as is the clock signal from the 200 kHz. oscillator at node 166. The output of the [4011] NAND gate at node 168 is sent into clock input of the [4040] 12 bit binary counter [8]. This counter will count the total number of pulses occurring from the beginning of the scan until the first video edge was encountered. The count in the counter now represents the position of the first edge. The counter binary output word is then latched into the 12 bit binary latch [one and one half 74LS573's] by the latch pulse at node 170. The latch pulse [4] at node 170 is generated in the NE558 by the inverted leading edge of the sync pulse [3] from node 149 that marks the end of the sensor scan cycle. The microprocessor can input the binary word from the latch at any time between latch pulses. Duplicate circuitry may be used to process the video signals from the second sensor. Again, a 12 bit word is latched at the end of each scan to represent the position of the opposite edge of the workpiece.

After the first negative going edge is detected in the video signal at node 161, additional negative going edges will have no effect on the Q output of the 4013 at node 139 until a new scan is started and the 4013 is again set to logic one. This will allow multiple edges to occur on a sensor without confusing the system. With the inverse video mode selected at node 161, Only the first rising edges encountered as the sensors scan outward will be considered as valid signals.

Each position measurement read by the microprocessor as above, is stored in an array. When the sensors can no longer find a pair of valid edges for processing, the positions stored in the array are processed. Each scan measurement pair is processed into a length measurement (see below). An equal number of measurements is taken from before and after the midpoint in the stored measurement array. These are added together and then divided by the total number of measurements used to determine the average.

Single Measurement Pair Length Calculation:

Given: P1=Position of the Leading Edge In the Pair
P2=Position of the Trailing Edge In the Pair
G=Gain of the Sensors (Determined During Calibration)
K=Offset Distance Between the Sensor Ends (Determined During Calibration)

$$\text{Length } L \ (N) = [(P1(n) + P2(N)) \times G] + K$$

Note that this reading will be inaccurate unless both edges occur at the same time in the sensor scans. If the measurement number array contains 24 readings, 12 of them occurred before mid scan and 12 occurred after mid scan.

$$\text{The Accurate Length} = [L(1) + L(2) \ldots + L(24)]/24$$

The length measurement computed as above will be accurate as long as the velocity of the product remains relatively constant during the measurement process. The part velocity can vary from very slow to very fast with little effect on the measurement accuracy, other than the number of readings available for averaging. If the product is accelerating or decelerating, during its passage over the sensors, there will be an error introduced. This happens because more time is spent on one side of the centered reading than on the other. If the object is accelerating, it will spend more time (allow more readings) before it is centered than after it is centered. This would tend to make the object length measurement too short. Acceleration or deceleration of the measured object can be determined by examining the measured displacement of either edge of the object during the first two and last two valid scans. If the velocity was constant while the measured object passed over the emitters, the displacement measured between scans will be the same at the beginning and at the end of the measurement cycle. Any measured acceleration or deceleration can be used to compensate the length measurement appropriately. Calculations are shown below for determining velocity and acceleration.

The sensor can also be used to measure accurately the velocity of the leading or trailing edge of an object traveling along a line parallel to the scan path. Two successive scans of an edge position are required for this computation.

Given:

T(S)=The time required for one complete scan
R=The actual measurement range of the sensor.
(note: Range depends on Passline and Separation distances)

During the first two scans, the following variables are recorded:

T(0) The time at the beginning of the first scan
P(1) The position of the first edge when it was first encountered
T(2) The time at the beginning of the second scan
P(2) The position of the first edge when it was encountered the second time Calculations can now be performed to determine two more variables:

T(1) The time at which the first edge was encountered during the first scan $$T(1) = T(0) + [T(S) \times (R/P(1))]$$

T(3) The time at which the first edge was encountered in the second scan $$T(3)=T(2)+[T(S)\times(R/P(2))]$$

Sufficient variables are now known to compute the average velocity of the leading edge:

T=T(3)−T(1) The time between edge encounters
D=P(2)−P(1) The displacement between edge encounters
V=D×T The average velocity of the edge during the time of the two scans When the active measurement range of the sensors permits, multiple scans of the moving objects will enable the measurement of acceleration and deceleration. Acceleration and deceleration are represented as the derivative of the velocity measurements from successive scans with respect to the time between the edge encounters.

$$G=dV/dT \text{ where } G=\text{Acceleration or Deceleration}$$

At least three scans are required to measure this derivative. The dV term is the difference in velocity calculations from scans 1 & 2 and scans 2 & 3. The dT term is the difference in times from scans 1 & 2 and scans 2 & 3.

With the accurate measurement of velocity and acceleration, it is possible to make length measurements with a single sensor as well.

The first case involves length measurement where the part is shorter than the length of the sensor measurement range. At least two valid scans (both leading and trailing edges detected in one scan) are required for this measurement. If the scan is in the direction of part travel, the raw measurement will always be longer than the actual part. If the velocity is known and the time between leading and trailing edge encounters can be calculated. The travel time between encounters multiplied by the velocity will yield the exact correction factor (displacement) to subtract from the raw measurement. Once again, this length measurement will be independent of part velocity, as long as velocity is constant. If the scan direction were opposite to the part travel, the correction factor would be added to the raw measured length to compute actual part length.

S=Fixed scan time for one scan
R=Total measurement Range of the Sensor
P1=Leading Edge Position in first scan
P2=Trailing Edge Position in first scan
P3=Leading Edge Position in 2nd scan
P4=Trailing Edge Position in 2nd scan
D=P3−P1 (displacement from 1st to 2nd scan)
T=S+[S×(S×R/D)] (time from 1st to 2nd measurement of leading edge)
Raw Length=P2−P1
Correction=D×T
Actual Length (1)=(P2−P1)−(D×T)
P3 and P4 can also be used:
Raw Length=P4−P3
Correction=D×T
Actual Length (2)=(P4−P3)−(D×T)

[Actual Length (1)+Actual Length (2)]/2=Average Actual Length

In this situation, it is possible to measure the velocity of the component at the leading edge and again at the trailing edge of the component. It is possible to compute the time when each edge passed over the center of the sensor. It is possible to multiply the average velocity times the time from leading edge centered to trailing edge centered to compute the length. This method will be very accurate when the velocity is constant. Accurate length can also be computed when the acceleration or deceleration is constant. If the acceleration or deceleration changes during the time the component is passing over the sensor, the length measurement can not be made. The present invention offers a much more accurate measurement of velocity and acceleration because many position measurements can be made on each edge, with precise crystal controlled time between them. Because they are non-contact measurements, they are not subject to slippage and vibrations as are other contact methods.

EXAMPLE

A cut piece of metal of 48 inches long moves at 240 feet per minute over a pair of 40 inch long scan sensors whose center lines are 48 inches apart. Two hundred and forty-eight feet per minute is equivalent to 0.048 inches per millisecond. It takes 20 milliseconds to scan a 48 inch sensor at 2,000 inches per second. In 20 milliseconds the cut piece of metal will move 0.96 inch. When the strip is in the exact center of both sensors, the scans of both emitters will intercept the edge of the metal strip at the same instant in time. At this point, when the intercepts occur at the same instant, there is no error in the length measurement made by the system of the present invention.

Assume that the emitters are scanned from the middle of the strip outward toward the ends. During the next scan of the emitters, 20 milliseconds later, the strip will have moved almost 1 inch down the process line. The first emitter scan will intercept the trailing edge in less than 20 milliseconds, while the leading edge of the strip will be intercepted in more than 20 milliseconds after the emitter scans are begun. The strip will appear to be longer than 48 inches, in that it will continue to move as the scan waits to encounter the second edge. Before the strip reaches the center lines of the emitters, the measured length will appear to be shorter than the actual length. In this situation, the second emitter encounters the leading edge very early in the scan. At some time later, the second emitter will have nearly completed its scan when the trailing edge of the strip is encountered. At this point, the length of the strip would appear to be almost one inch too short. By adding together an equal number of scans before and after the point where the leading and trailing scans are most equal, a nearly perfect length measurement of the strip may be calculated, independent of strip speed. The more scans that are used in the average, the more precise the measurement is. Any length strip that may provide a suitable number of scans to be averaged can be measured with the system of the present invention.

A preferred range of operation for the above system as it is configured, is for objects to be measured that are as small as 12 inches long or as long as 86 inches long at speeds 240 feet per minute or less. Greater processing speeds will reduce the useful measurement dynamic range and the accuracy of measurements made near the extremes of the measurement range.

It is to be recognized that the above described example is not intended to limit the scope of the present invention and is offered only as a point of clarifying the nature of the present invention. Different combinations of length of parts to be measured and process speeds are available in additional embodiments of the present invention.

What is claimed is:

1. A measurement system for measuring the length of a material workpiece traveling in a direction, comprising:

a first array of discrete electromagnetic radiation emitting devices, said first array located a distance from a surface of said material workpiece, said first array extending in said direction of travel, each of said first devices being responsive to the application of current thereto to emit radiation;

a first receiver responsive to radiation emitting from said first devices, said first receiver located a stand-off distance from an opposite side of said material workpiece and above said first array;

a second array of discrete electromagnetic radiation emitting devices, said second array located a distance from a surface of said material workpiece, said second array extending in said direction of travel, each of said second array devices being responsive to the application of current thereto to emit radiation;

a second receiver located a stand-off distance from the opposite side of said second array and responsive to radiation from said second array, and wherein said first receiver is located above said first array and said second receiver is located above said second array;

a drive circuit for applying said current to said discrete radiation emitting devices; and a processor for receiving signals from said first receiver and said second receiver, said processor adapted to extrapolate said signals and to provide said length.

2. A measurement system for measuring the length of a material workpiece traveling in a direction, comprising:

a first array of discrete electromagnetic radiation emitting devices, said first array located a distance from a surface of said material workpiece, said first array extending in said direction of travel, each of said first devices being responsive to the application of current thereto to emit radiation;

a first receiver responsive to radiation emitting from said first devices, said first receiver located a stand-off distance from an opposite side of said material workpiece and above said first array;

a second receiver located a stand-off distance from the opposite side of said first array and responsive to radiation from said first array, and wherein said first receiver is located above a first radiation emitting device in said first array and said second receiver is located above a last radiation emitting device in said first array;

a drive circuit for applying said current to said discrete radiation emitting devices; and a processor for receiving signals from said first receiver and said second receiver, said processor adapted to extrapolate said signals and to provide said length.

3. A measurement system for measuring the length of a material workpiece traveling in a direction, comprising:

a first array of discrete electromagnetic radiation emitting devices, said first array located a distance from a surface of said material workpiece, said first array extending in said direction of travel, each of said first devices being responsive to the application of current thereto to emit radiation;

a first receiver responsive to radiation emitting from said first devices, said first receiver located a stand-off distance from an opposite side of said material workpiece and above said first array and wherein said first receiver is located above a center radiation emitting device in said first array;

a drive circuit for applying said current to said discrete radiation emitting devices; and a processor for receiving signals from said first receiver, said processor adapted to extrapolate said signals and to provide said length.

* * * * *